United States Patent [19]

Satomoto

[11] 4,241,873
[45] Dec. 30, 1980

[54] TEMPERATURE RESPONSIVE VALVE DEVICE

[75] Inventor: Atsushi Satomoto, Toyota, Japan

[73] Assignee: Aisin Seiki Kabushiki Kaisha, Kariya, Japan

[21] Appl. No.: 70,527

[22] Filed: Aug. 28, 1979

[30] Foreign Application Priority Data

Sep. 13, 1978 [JP] Japan ............................ 53-125842[U]

[51] Int. Cl.³ .......................................... G05D 23/08
[52] U.S. Cl. ..................................... 236/87; 123/588;
137/550; 236/101 C
[58] Field of Search ................... 236/87, 48 R, 101 A,
236/101 C; 137/550; 123/119 D, 124 A

[56] References Cited

U.S. PATENT DOCUMENTS

| | | | |
|---|---|---|---|
| 1,757,430 | 5/1930 | Jones | 137/550 X |
| 1,897,572 | 2/1933 | Cornell, Jr. | 137/550 X |
| 3,443,693 | 5/1969 | Biermann | 137/550 X |
| 3,857,373 | 12/1974 | Martin et al. | 123/117 A |
| 4,044,732 | 8/1977 | Inada et al. | 123/119 D X |
| 4,076,172 | 2/1978 | Inada et al. | 236/87 X |
| 4,098,452 | 7/1978 | Benjamin | 236/87 |
| 4,108,372 | 8/1978 | Brakebill | 236/101 C X |
| 4,157,158 | 6/1979 | Kitamura | 236/87 X |
| 4,181,254 | 1/1980 | Yoshihiro et al. | 236/101 C X |

Primary Examiner—Albert J. Makay
Assistant Examiner—William E. Tapolcai, Jr.
Attorney, Agent, or Firm—Oblon, Fisher, Spivak, McClelland & Maier

[57] ABSTRACT

A temperature responsive valve device including a body having first, second and third ports, a first passage member disposed between the first and second ports, a second passage member disposed between the second and third ports, a member defining an orifice arranged within the first passage member for delaying transmission of fluid therethrough, a first filter member arranged between the orifice member and the first port and within the first passage member, a second filter member arranged within the first and second passage members and between the orifice member and the second port as well as between the second and third ports, a passage defining member having an annular portion which contacts with the second filter member to thereby allow fluid communication between an inner portion of the annular portion with the first port and communication of an outer portion of the annular portion with the third port only through means of the second filter member, and a temperature responsive valve member for interrupting communication of the third port with the second port in response to change in temperature.

7 Claims, 1 Drawing Figure

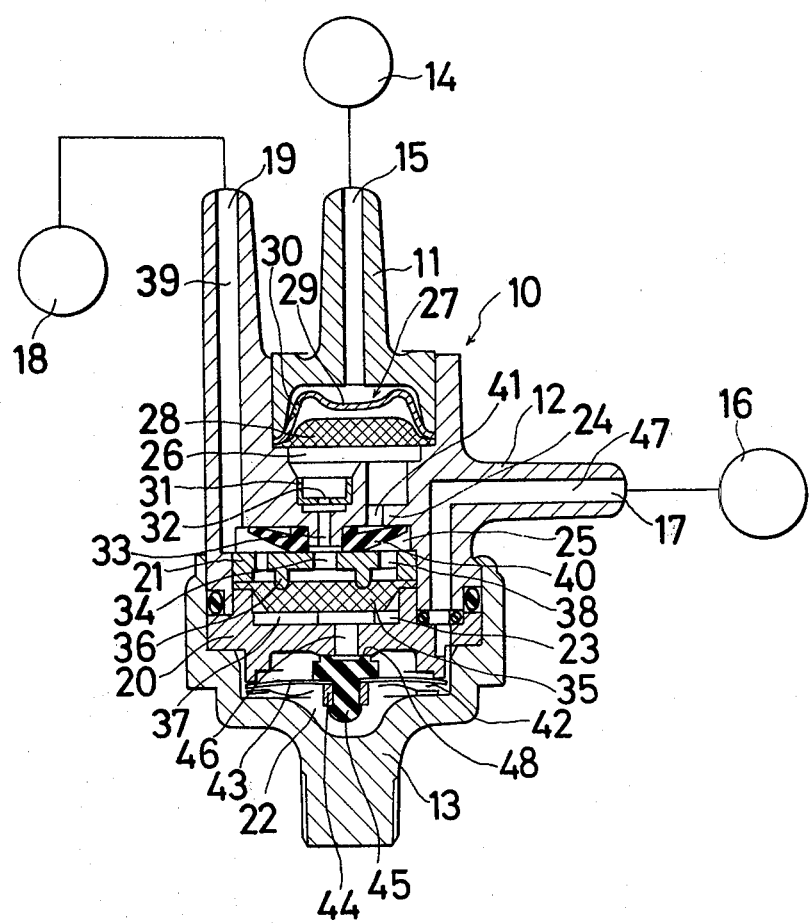

TEMPERATURE RESPONSIVE VALVE DEVICE

BACKGROUND OF THE INVENTION

1. Field of the Invention

This invention relates to a valve device and more particularly to a temperature responsive valve device which provides an on-off control of fluid communication in response to change in temperature.

2. Description of the Prior Art

Various emission control systems have been proposed such as a secondary air supply system where CO, HC and the like, which are contained within imperfect combustion gases from vehicle engines, are reacted within an exhaust system of a vehicle. In such secondary air supply system, it is desired that supply of air is allowed only under the prescribed running conditions of the vehicle in view of the drivability of the vehicle. Thus, conventionally, valve devices have been proposed which provide on-off control of secondary air supply passages in response to signal vacuum within an intake manifold of a vehicle engine.

Furthermore, it is desired that the supply of secondary air be controlled in response to changes in temperature, whereby temperature responsive valve devices have been proposed which control on-off transmission of the signal vacuum. Such temperature responsive valve devices have valve portions which are adapted to selectively transmit one of the intake manifold's vacuum and atmosphere to a signal chamber of the secondary air supply valve device. Thus, within the temperature responsive valve device, a first filter is arranged near an inlet port which receives the intake manifold vacuum and a second filter is arranged near an inlet port which communicates with atmosphere.

Furthermore, it is desired that the temperature responsive valve devices have a delay means of an orifice type between the first filter and the outlet port to thereby delay transmission of intake manifold vacuum pressure. In order to prevent clogging of the associated orifice by foreign matter, a third filter has to be provided between the orifice and the secondary air supply valve device. This results in high cost and complex constructions of the temperature responsive valve devices.

SUMMARY OF THE INVENTION

It is therefore an object of the present invention to provide an improved temperature responsive valve device which obviates the above-noted conventional drawbacks.

It is another object of the present invention to provide an improved temperature responsive valve device which is low in cost and simple in construction.

BRIEF DESCRIPTION OF THE DRAWINGS

Various objects, features and attendant advantages of the present invention will be appreciated from a review of the accompanying drawing, wherein:

The sole FIGURE is a sectional view of a temperature responsive valve device according to the present invention.

DETAILED DESCRIPTION OF THE PREFERRED EMBODIMENT

A temperature responsive valve device 10 has first, second and third bodies 11, 12, 13, respectively, which are secured to one another. The first body 11 has a first inlet port 15 which receives vacuum pressure from a vacuum source such as intake manifold 14 of the vehicle engine while the second body 12 has a second inlet port 17 which is in communication with an atmospheric pressure source 16 at one side and an outlet port 19 which is in communication with a fluid pressure operated device such as secondary air supply device 18.

A partition member 20 is securely arranged between the second and third bodies 12 and 13 and a passage defining member 21 is securely arranged within the body 12, whereby first and second chambers 22, 23 are defined within the bodies. The second body 12 has an inwardly extension 24 to thereby define a third and fourth chamber 25 and 26, respectively.

Dust removing member 27 and first filter member 28 are arranged within the fourth chamber 25 and outer peripheries of members 27 and 28 are supported by means of and between the bodies 11 and 12. The member 27 has a concave portion 29 which confronts the inlet port 15 to thereby catch dust and the like within the intake manifold vacuum from the port 15 to the chamber 26. The intake manifold vacuum passes through a hole 30 of the dust removing member 27 to the first filter member 28 which further removes dust and the like by vacuum.

The fourth chamber 26 is in communication with the second chamber 23 through means of an orifice 32 of an orifice member 31 securely fit in the body 12, an opening 33 provided in the body 12 and an opening 34 provided in the member 21.

A second filter member 35, the outer periphery of which is supported between the members 20 and 21, is arranged within the second chamber 23 and is pressingly supported by projections 36 and 37 provided on the member members 21 and 20, respectively. Thus, the upper surface of the second filter 35 is continuously brought into contact with the annular projection or portion 36 of the member 21 to thereby allow communication between openings 34 and 38 only through second filter 35. Therefore, the intake manifold vacuum which leads to the opening 34 is dependably transmitted to the outlet port 19 through the second filter 35, opening 38 on the member 21, the third chamber 25 and a passage 39.

Disposed within the third chamber 25 is a check valve 40 of an umbrella type which opens an opening 41 provided in the body 12 parallel with the orifice 32 to thereby complete direct communication between ports 15 and 19 only when vacuum pressure at the outlet port 19 is larger than vacuum pressure at the inlet port 15.

A bimetallic disc 43 is supported by a spring 42 within the chamber 22 and is changeable between the illustrated upwardly convex configuration in the FIGURE and the downwardly convex configuration in response to changes in temperature. A resilient valve member 45 is positioned within a central hole of the bimetallic disc 43 and is supported by a support member 44. The valve member 45 is engageable with a seat 48 on the member 20 to thereby provide on-off control of an opening 46 which is provided on the member 20 and completes fluid communication between the first and second chambers 22 and 23. The first chamber 22 is continuously in communication with the inlet port 17 through means of a passage 47, but the fluid communication between ports 17 and 19 is interrupted since the opening 46 is closed when the bimetallic disc 43 is in its illustrated position. The outer periphery of the body 13 may have threads which are threaded through the wall of the engine water jacket and thus, the bimetallic disc 43 may sense changes in temperature of engine cooling water.

In operation, parts of the temperature responsive valve device 10 are in their illustrated positions when the temperature of the engine cooling water is higher than a predetermined temperature. Under these conditions, the valve member 45 engages with seat 48 to thereby interrupt fluid communication between the inlet port 16 and the outlet port 19. Thus, the intake manifold vacuum is transmitted from the intake manifold 14 to the secondary air supply device 18 through port 15, hole 30, first filter 28, orifice 32, passages 33 and 34, second filter 35, passages 38 and 39, and port 19. Therefore, when the intake manifold vacuum pressure is larger than the predetermined vacuum pressure upon a low load running condition of the vehicle and the like, the secondary air supply device 18 operates to supply the secondary air into the exhaust system of the vehicle.

When the vehicle is suddenly accelerated from the above conditions, the intake manifold vacuum pressure is suddenly decreased. Thus, the check valve 40 opens to allow the atmospheric pressure in the intake manifold 14 to communicate with the secondary air supply device 18 through first inlet port 15, opening 41 and outlet port 19. The vacuum in the secondary air supply device 18, therefore, will be returned.

When the intake manifold vacuum pressure is lower than the predetermined pressure upon high load running conditions of the vehicle and the like, even when the valve member 45 engages with the seat 48, the secondary air supply device 18 is still maintained in its non-operating condition so that supply of the secondary air into the exhaust system is still interrupted. From the above conditions, when the vehicle is suddenly decelerated, the transmission of vacuum from the inlet port 15 to the outlet port 19 is delayed for a predetermined time by means of the arrangement of the orifice 32 and thus, the operation of the secondary air supply device is delayed correspondingly.

When the temperature of engine cooling water is lower than the predetermined temperature, the bimetallic disc 43 is changed from its illustrated configuration to a downwardly convex configuration so that the valve member 45 is spaced from the seat 48 to thereby open the opening 46. Then, the outlet port 19 receives atmospheric pressure from atmospheric source 16 by means of passages 39, 38, second filter 35, opening 46, chamber 22, passage 47 and inlet port 17. Thus, the secondary air supply device 18 is maintained in its non-operating condition regardless of vehicle running conditions.

If annular projection 36 is provided on partition member 20 and the opening 38 is provided in the member 20, and this opening is in communication with the outlet port 19, it is apparent that the same operation and effect as that of the previous embodiment will be attained.

As will be clear from the previous discussion, the second filter 35 is arranged within the fluid passage between the outlet port 19 and the orifice 31 as well as within the fluid passage between atmospheric source 16 and outlet port 19. Accordingly, it is not necessary to provide a further orifice between the fluid pressure operated device 18 and the orifice 31.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A temperature responsive valve device comprising:
   a body having first, second and third ports;
   first passage means disposed between said first and second ports;
   second passage means disposed between said second and third ports;
   means defining an orifice arranged within said first passage means for delaying transmission of fluid therethrough;
   a first filter member arranged between said orifice means and said first port and within said first passage means;
   a second filter member arranged within said first and second passage means and between said orifice means and said second port as well as between said second and third ports;
   a passage defining member having an annular portion which contacts with said second filter member to thereby allow fluid communication between an inner portion of said annular portion with said first port and communication of an outer portion of said annular portion with said third port only through means of said second filter member; and
   a temperature responsive valve member for interrupting communication of said third port with said second port in response to change in temperature.

2. A temperature responsive valve device as set forth in claim 1, said temperature responsive valve member comprising:
   a bimetallic disc member having a hole formed therein, changeable between an upwardly convex configuration and a downwardly convex configuration; and
   a resilient valve member positioned within said hole formed in said bimetallic disc member.

3. A temperature responsive valve device as set forth in claim 2, said temperature responsive valve member further comprising:
   a spring member for biasing said bimetallic disc member and said resilient valve member so as to interrupt communication of said third port with said second port.

4. A temperature responsive valve device as set forth in claim 1, said first, second and third ports communicating with a vehicle intake manifold, an atmospheric pressure source and a secondary air supply, respectively, and further comprising check valve means disposed adjacent said passage defining means for controlling communication of said secondary air supply with said intake manifold.

5. A temperature responsive valve device as set forth in claim 1, said first, second and third ports communicating with a vehicle intake manifold, an atmospheric pressure source and a secondary air supply, respectively.

6. A temperature responsive valve device as set forth in claim 1, said annular portion comprising an annular projection formed on said passage defining member.

7. A temperature responsive valve device as set forth in claim 1, further comprising:
   dust removal means disposed adjacent said first filter member.

* * * * *